March 8, 1966  K. WILFERT ETAL  3,239,269
VEHICLE ROOF CONVEXLY AND CONCAVELY CURVED WITH RIM THEREFOR
Filed Sept. 25, 1962

INVENTORS
KARL WILFERT
BÉLA BARÉNYI
BY
Dicke & Craig
ATTORNEYS

United States Patent Office 3,239,269
Patented Mar. 8, 1966

3,239,269
VEHICLE ROOF CONVEXLY AND CONCAVELY CURVED WITH RIM THEREFOR
Karl Wilfert, Stuttgart-Degerloch, and Béla Barényi, Stuttgart-Vaihingen, Germany, assignors to Daimler-Benz Aktiengesellschaft, Stuttgart-Unterturkheim, Germany
Filed Sept. 25, 1962, Ser. No. 226,049
Claims priority, application Germany, Sept. 28, 1961, D 37,137
10 Claims. (Cl. 296—137)

The present invention relates to an improvement and further development of flat or slightly convexly and/or concavely curved roofs, especially for motor vehicles, and a roof rim portion extending at least on three sides thereof, preferably in front and laterally, beyond the vehicle top which roof rim portion, together with the roof surface, forms a rim channel structure.

The present invention essentially consists in so arranging the roof that the rim extends in a plane surface upwardly and outwardly from the place of angular bent thereof at the roof surface up to the outermost roof edge to such an extent that the edge of the roof comes to lie approximately in the same plane as or above the roof surface imagined approximately widened and lengthened.

According to a further feature of the present invention, the roof rim portion forms an angle with the vertical passing through the point of angular bent of between 40°–50°, especially of 45°. Such a roof rim portion considerably contributes to the increase in roof rigidity and permits a simple mounting and attachment of support surfaces by means of which a further reinforcement of the roof is achieved, particularly in the case when the support surfaces form a hollow box-like bearer together with the roof rim portion.

Accordingly, it is an object of the present invention to provide a roof structure, particularly for motor vehicles, which permits, by simple means, certain improvements and advantages over the prior art construction as regards rigidity and manufacturing ease.

Another object of the present invention resides in the provision of a roof structure, particularly for motor vehicles, which is so constructed and arranged as to increase considerably the rigidity of the roof.

A further object of the present invention resides in the provision of a roof structure, particularly for motor vehicles, which brings about a further roof reinforcement by a simple mounting and securing of supporting surfaces that cooperate with the roof panel to form hollow bearer members.

A still further object of the present invention resides in the provision of a roof structure that may be manufactured in a particularly simple manner, especially insofar as the rim portion thereof is concerned, obviating the need for expensive tools and dies.

Still another object of the present invention resides in the provision of a roof structure, particularly for motor vehicles, of the type mentioned hereinabove which offers better protection against corrosion damage, and which permits simple assembly of the vehicle top.

These and other objects, features, and advantages of the present invention will become more obvious from the following description when taken in connection with the accompanying drawing which shows, for purposes of illustration only, one embodiment in accordance with the present invention and wherein FIGURE 1 is a longitudinal cross-sectional view through the roof of a passenger motor vehicle in accordance with the present invention, taken along line I—I of FIGURE 2;

Figures 3, 4:
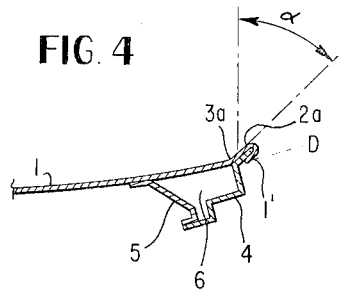
FIGURE 3 is a partial cross-sectional view taken along line III—III of FIGURE 2.
FIGURE 4 is a partial cross-sectional view taken along line IV—IV of FIGURE 2.

Referring now to the drawing wherein like reference numerals are used throughout the various views to designate like parts, reference numeral 1 designates in the illustrated embodiment a substantially flat roof which is curved slightly convexly in the longitudinal direction and slightly concavely in the transverse direction of the vehicle. The rim portion 2, 2a, and 2b of the roof is angularly bent outwardly around the entire roof circumference, in continuation of the outer roof surface boundary, properly speaking, so that the roof rim portion forms, together with this roof surface, a more or less deep channel 3, 3a, and 3b. Along the sides of the roof, the channel 3a (FIGURES 3 and 4) is of relatively small cross-sectional configuration, i.e., of small depth and decreases in depth in the direction from one toward the other vehicle end, for example, toward the rear of the vehicle (FIGURE 4). Only at the transverse end sides of the roof, i.e., along the front and rear sides does the channel 3a and 3b become more strongly noticeable, that is, of relatively larger depth. Furthermore, the arrangement according to the present invention is so made that the roof rim portion subtends with a vertical passing through the channel bottom, i.e., the place of angular bent, and angle $d$ between 40° and 50°, particularly of 45°. The zenithal lines of the individual sections of the roof rim are disposed practically at the height of the roof surface 1, imagined widened and lengthened as shown by dash lines D—D in FIGURES 1, 3 and 4.

The particular roof construction in accordance with the present invention permits an especially rational and economic manufacture of the roof since, during manufacture thereof, it is only necessary to move about the folding or notching tool carriage along the rim of the roof.

A further simplification of the manufacture in accordance with the present invention results from the fact that the roof rim strips or sheeting 1' projecting beyond the outer roof-rim support members 4 and 4' in the form of strips or the like are folded or flanged from the inside toward the outside over the edge portions of the supporting members 4 and 4' and are secured along the underside thereof. This arrangement additionally entails the advantage that the surfaces between the folded or flanged part of the roof rim portion and the supporting members 4 and 4' may be more easily kept free of dampness and moisture, particularly rain water, than would be possible, for example, with a folding or flanging of the rim portions of the supporting members 4 and 4' from the outside toward the inside about the roof rim portions. The transversely extending roof rim end portion 2b forming, for example, the forward roof rim portion rests directly on the associated supporting strip or member 4'. Along the other rim portions of the roof, the upper roof surfaces, together with the outer strip-like supporting members 4 and inner strip-like supporting members 5, enclose the hollow space 6, that is, they form a hollow box-like longitudinal and cross bearer reinforcing the roof rim portion.

Figure 1:
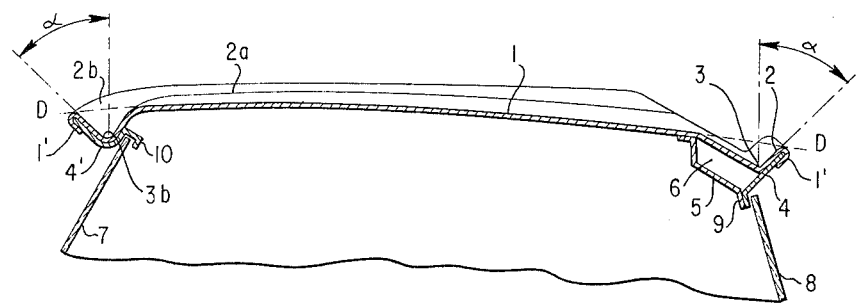
Figure 2:
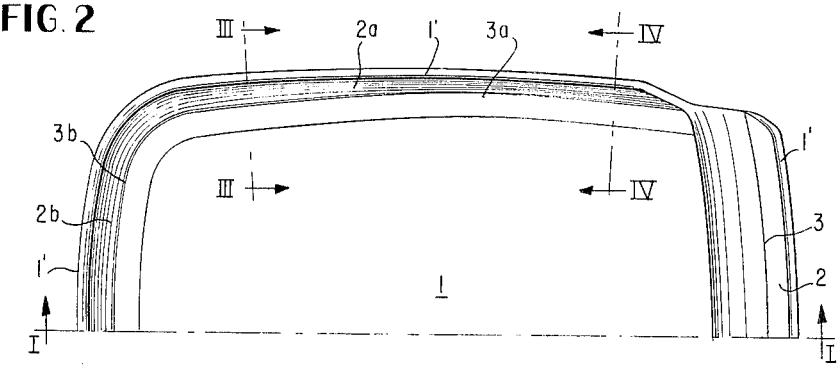
FIGURE 2 is a partial plan view of the roof of FIGURE 1.

In FIGURE 1, reference numeral 7 designates the windshield and reference numeral 8 the rear window. Both supporting strips or members 4 and 5 are combined into an abutment flange 9 for receiving the rear window 8 and are angularly bent correspondingly with an inclination toward the respective vehicle end. The inner rim of the supporting strip or member 4' is shaped into a special U-shaped frame section 10 for the accommodation therein of the windshield 7.

While we have shown and described one embodiment in accordance with the present invention, it is understood that the same is not limited thereto but is susceptible of

We claim:

1. A roof structure, especially for motor vehicles having a vehicle top, comprising approximately flat roof panel means and roof rim means projecting at least on three sides thereof beyond said roof panel means, the roof rim means, together with said roof panel means forming a rim channel, an angular bent being formed in said rim channel, said roof rim means extending upwardly and outwardly in a substantially plane surface from the place of the angular bent to the outermost roof edge for such a distance that the roof edge again comes to lie approximately within the surface of said approximately flat roof panel means.

2. A roof structure, especially for motor vehicles having a vehicle top, comprising approximately flat roof panel means and roof rim means projecting at least on three sides thereof beyond said roof panel means, the roof rim means, together with said roof panel means forming a rim channel, an angular bent being formed in said rim channel, said roof rim means extending upwardly and outwardly in a substantially plane surface from the place of the angular bent to the outermost roof edge for such a distance that the roof edge again comes to lie approximately within the surface of said approximately flat roof panel means, and said roof rim means forming an angle of 40°–50° with a vertical plane passing through the place of the angular bent.

3. A roof structure, especially for motor vehicles having a vehicle top, comprising approximately flat roof panel means and roof rim means projecting at least on three sides thereof beyond said roof panel means, the roof rim means, together with said roof panel means forming a rim channel, an angular bent being formed in said rim channel, said roof rim means extending upwardly and outwardly in a substantially plane surface from the place of the angular bent to the outermost roof edge for such a distance that the roof edge again comes to lie approximately within the surface of said approximately flat roof panel means, and said roof rim means forming an angle of approximately 45° with a vertical plane passing through the place of the angular bent.

4. A roof structure, especially for motor vehicles having a vehicle top, comprising approximately flat roof panel means and roof rim means projecting at least on three sides thereof beyond said roof panel means, the roof rim means, together with said roof panel means forming a rim channel, an angular bent being formed in said rim channel, said roof rim means extending upwardly and outwardly in a substantially plane surface from the place of the angular bent to the outermost roof edge for such a distance that the roof edge again comes to lie approximately within the surface of said approximately flat roof panel means, and supporting means for supporting said rim means, the outer edge portion of said rim means being folded over said supporting mean from the inside of said bent toward the outside and being flanged against the underside thereof.

5. A roof structure, especially for motor vehicles having a vehicle top, comprising approximately flat roof panel means and roof rim means projecting at least on three sides thereof beyond said roof panel means and integral therewith, the roof rim means, together with said roof panel means forming a rim channel, an angular bent being formed in said rim channel, said roof rim means extending upwardly and outwardly in a substantially plane surface from the place of the angular bent to the outermost roof edge for such a distance that the roof edge again come to lie approximately within the surface of said approximately flat roof panel means, and supporting means for supporting said rim means, the outer edge portion of said rim means being folded over said supporting means from the inside of said bent toward the outside and being flanged against the underside thereof, said rim means resting directly on said supporting means over a portion of the roof periphery.

6. A roof structure, especially for motor vehicles having a vehicle top, comprising approximately flat roof panel means and roof rim means projecting at least on three sides thereof beyond said roof panel means, the roof rim means, together with said roof panel means forming a rim channel, an angular bent being formed in said rim channel having a continuously varying depth along the entire extent thereof, said roof rim means extending upwardly and outwardly in a substantially plane surface from the place of the angular bent to the outermost roof edge for such a distance that the roof edge again comes to lie approximately within the surface of said approximately flat, roof panel means, and supporting means for supporting said rim means, said supporting means including an outer strip-like support element and an inner strip-like support element, and said rim means cooperating at least over part of its periphery with said inner and outer support elements to form a hollow bearer member.

7. A roof structure, especially for motor vehicles having a vehicle top and a rear window, comprising approximately flat roof panel means and roof rim means projecting at least on three sides thereof beyond said roof panel means, the roof rim means, together with said roof panel means forming a rim channel, an angular bent being formed in said rim channel having a continuously varying depth along the entire extent thereof, said roof rim means extending upwardly and outwardly in a substantially plane surface from the place of the angular bent to the outermost roof edge for such a distance that the roof edge again comes to lie approximately within the surface of said approximately flat roof panel means, and supporting means for supporting said rim means, said supporting means including an outer strip-like support element and an inner strip-like support element, and said rim means cooperating at least over part of its periphery with said inner and outer support elements to form a hollow bearer member, the two rearward inner and outer support elements of said bearer member being combined into an abutment flange for the rear window and inclined toward the respective vehicle end.

8. A roof structure, especially for motor vehicles having a vehicle top, comprising approximately flat roof panel means and roof rim means projecting at least on three sides thereof beyond said roof panel means, the roof rim means, together with said roof panel means forming a rim channel, an angular bent being formed in said rim channel, said roof rim means extending upwardly and outwardly in a substantially plane surface from the place of the angular bent to the outermost roof edge for such a distance that the roof edge again comes to lie approximately within the surface of said approximately flat roof panel means, and supporting means for supporting said rim means, said rim means resting directly on said supporting means over a portion of the roof periphery, the supporting means on which said rim means rests directly being formed into a U-shaped frame section for securing therein the vehicle windshield.

9. A roof structure, especially for motor vehicles having a vehicle top, comprising approximately flat roof panel means and roof rim means projecting at least on three sides thereof beyond said roof panel means, the roof rim means, together with said roof panel means forming a rim channel having a continuously varying depth along the entire extent thereof, an angular bent being formed in said rim channel, said roof rim means extending upwardly and outwardly from the place of the angular bent to the outermost roof edge for such a distance that the roof edge again comes to lie aproximately within the surface of said approximately flat roof panel means.

10. A roof structure, especially for motor vehicles having a vehicle top and a rear window, comprising approximately flat roof panel means and roof rim means projecting at least on three sides thereof beyond said roof panel means, the roof rim means, together with said roof panel means forming a rim channel, an angular bent being formed in said rim channel, said roof rim means extending upwardly and outwardly in a substantially plane surface from the place of the angular bent to the outermost roof edge for such a distance that the roof edge again comes to lie approximately within the surface of said approximately flat roof panel means, and supporting means for supporting said rim means, the outer edge portion of said rim means being folded over said supporting means from the inside of said bent toward the outside and being flanged against the underside thereof, said rim means resting directly on said supporting means over a portion of the roof periphery, said supporting means including an outer strip-like support element and an inner strip-like support element, and said rim means cooperating at least over part of its periphery with said inner and outer support elements to form a hollow bearer member, the two rearward inner and outer support elements of said bearer member being combined into an abutment flange for the rear window and inclined toward the respective vehicle end, the supporting means on which said rim means rests directly being formed into a U-shaped frame section for receiving therein the vehicle windshield.

References Cited by the Examiner

UNITED STATES PATENTS

| 1,581,670 | 4/1926 | Bolender et al. | 296—137 |
| 2,256,837 | 9/1941 | Trautvetter | 296—137 |
| 2,930,652 | 3/1960 | Bidlingmaier | 296—137 |
| 2,991,121 | 7/1961 | Barenyi | 296—137 |
| 3,112,952 | 12/1963 | Barenyi. | |

FOREIGN PATENTS

| 223,455 | 12/1942 | Switzerland. |
| 815,194 | 6/1958 | Great Britain. |
| 843,233 | 3/1939 | France. |

A. HARRY LEVY, *Primary Examiner.*

PHILIP ARNOLD, *Examiner.*